United States Patent
Bähr

(10) Patent No.: US 7,727,132 B2
(45) Date of Patent: Jun. 1, 2010

(54) METHOD AND DEVICE FOR FITTING A MACHINE TOOL WITH TOOLS

(75) Inventor: Richard Bähr, Illerrieden (DE)

(73) Assignee: Richard Bähr GmbH Formen-und Werkzeugbau (DE)

( * ) Notice: Subject to any disclaimer, the term of this patent is extended or adjusted under 35 U.S.C. 154(b) by 0 days.

(21) Appl. No.: 12/279,457

(22) PCT Filed: Feb. 8, 2007

(86) PCT No.: PCT/EP2007/001069

§ 371 (c)(1),
(2), (4) Date: Aug. 14, 2008

(87) PCT Pub. No.: WO2007/093317

PCT Pub. Date: Aug. 23, 2007

(65) Prior Publication Data

US 2009/0209400 A1 Aug. 20, 2009

(30) Foreign Application Priority Data

Feb. 14, 2006 (DE) .................. 10 2006 006 958

(51) Int. Cl.
*B23Q 3/157* (2006.01)
*B23Q 11/10* (2006.01)

(52) U.S. Cl. .................... 483/13; 483/69; 483/37; 409/136; 408/56

(58) Field of Classification Search ............ 483/13, 483/16, 37, 63, 69; 409/136, 135; 408/62, 408/56; 451/449, 450

See application file for complete search history.

(56) References Cited

U.S. PATENT DOCUMENTS

| 4,669,933 A | 6/1987 | Dye |
| 4,795,292 A | 1/1989 | Dye |
| 5,275,516 A | 1/1994 | Liaw |
| 5,358,360 A | 10/1994 | Mai |

(Continued)

FOREIGN PATENT DOCUMENTS

DE 43 26 023 A1 3/1994

(Continued)

OTHER PUBLICATIONS

Internationa; Search Report dated May 9, 2007, issued in corresponding PCT Application No. PCT/EP2007/001069.

(Continued)

*Primary Examiner*—Erica E Cadugan
(74) *Attorney, Agent, or Firm*—Ostrolenk Faber LLP

(57) ABSTRACT

The invention relates to a method of fitting a machine tool with tools which are cooled by a free-flowing medium during operation of the machine tool, comprising the following method steps: a plurality of various tools are provided in order to carry out successive machining operations on a workpiece; a plurality of various nozzle devices are provided, each of which can be fitted together with a specific tool and connected to a medium source and has such a medium jet geometry that the respective medium jets strike locations where the machining takes place; a specific nozzle device is in each case fitted together with a specific tool and connected to the medium source before the operation of the machine tool is started.

4 Claims, 5 Drawing Sheets

U.S. PATENT DOCUMENTS

| | | | | |
|---|---|---|---|---|
| 5,535,496 | A | * | 7/1996 | Sugino et al. ............... 409/136 |
| 5,702,336 | A | * | 12/1997 | Kameyama .................. 483/67 |
| 6,126,526 | A | * | 10/2000 | Herrscher et al. ............. 483/13 |
| 6,471,573 | B1 | * | 10/2002 | Reitmeyer .................. 451/449 |
| 7,476,190 | B2 | * | 1/2009 | Braun ......................... 483/67 |
| 7,582,004 | B2 | * | 9/2009 | Schwartz et al. ............ 451/449 |
| 2005/0169718 | A1 | | 8/2005 | Beckington |

FOREIGN PATENT DOCUMENTS

| | | | |
|---|---|---|---|
| JP | 02-109654 A | * | 4/1990 |
| SU | 1366374 A1 | * | 1/1988 |

OTHER PUBLICATIONS

International Preliminary Examination Report dated Jul. 28, 2007, issued in corresponding PCT Application No. PCT/EP2007/001069.
Translation of International Preliminary Report on Patentability for International Application No. PCT/EP2007/001069, International Filing Date of Feb. 8, 2007 (10 pages), cited references previously submitted with Information Disclosure Statement filed with application on Aug. 14, 2008 and therefore not listed here.

* cited by examiner

METHOD AND DEVICE FOR FITTING A MACHINE TOOL WITH TOOLS

CROSS REFERENCE TO RELATED APPLICATIONS

The present application is a 35 U.S.C. §371 National Phase conversion of PCT/EP2007/001069, filed Feb. 8, 2007, which claims benefit of German Application No. 10 2006 006 958.7, filed Feb. 14, 2006, the disclosure of which is incorporated herein by reference. The PCT International Application was published in the German language.

BACKGROUND OF THE INVENTION

The invention concerns the machining of workpieces in a machine tool by means of a plurality of machining processes. Here different tools are used for the individual machining processes. The tools come into use one after another. Here not only tools of one and the same category come into consideration, such as for example milling cutters, but also tools of different categories, for example milling cutters, drill bits, and so on.

The tools are stored in a tool magazine. Here this can, for example, take the form of a turntable, on the circumference of which a large number of drill bits, milling cutters, and so on are suspended in the vertical position. Such a magazine is a component of a tool changer, which supplies a particular tool to the machine tool at a particular point in time. In this manner a machining programme is executed in a particular sequence with various tools and machining times.

When one talks here of a "machine tool" it is, of course, to be understood that this can also include a machining centre of a state-of-the-art form of construction, with which any chip removal machining processes can be executed.

An essential element of any machine tool with chip removal machining is the cooling, lubrication and washing system. With this both tool and workpiece are cooled and washed, that is to say, chips are removed from them. If this is not executed in a perfect manner, damage to both tool and workpiece can occur. Particularly serious are incidences of damage that cannot be immediately detected when they occur. An extremely important aspect is the cost of the tools. Thus a carbide milling cutter can, for example, cost several hundred euros. Washing is of fundamental importance for the service life of the milling cutter. This can be counted in hours, but also in minutes, or even in seconds. Decisive factors determining the service life are the washing and cooling.

Thus the washing must on the one hand be efficient. This means that the flow rate of the washing medium has to be sufficient, that is to say, sufficiently high to capture all the chips, even chip particles of minimal dimensions. On the other hand the washing process must be economical, that is to say the washing medium must not be supplied in excess, since the supply power is an important item in the cost analysis. This applies particularly to fluids, but also to air as a washing medium.

The efficiency depends to a very considerable extent on the washing jet of the medium impinging at the right location, in particular at the site at which the chip is being removed. The medium jet should thus always emerge at the correct angle from the nozzles of an appropriate nozzle body, so that it impinges at the correct location. However, this is exactly what is not always the case.

The reason for this lies in the fact that the tools have different dimensions, for example, they are short or long, or thick or thin. This was dealt with previously by directing the one or more medium jets on to one point, which in terms of average dimensions is the correct location. Since this can only be an approximate solution, an attempt is made to compensate for this deficiency by increasing the flow rate. The economics of the washing process suffer in turn as a result.

It would of course be possible to adjust the jet exiting from a nozzle body to another angle when the tool is changed. However this is not possible in practice, since it is bound up with personnel costs and is completely contrary to the concept of rationalisation. Also the accuracy of manual adjustments is insufficient.

US 2005/0169718 A1 describes a cooling device for the supply of a coolant to a tool. Here provision is made for a plurality of cooling devices for the various tools, with one application for each device, and particular attention is paid to fitting. Coolant impinges over the whole length of the tool.

The object of the invention is to define a method and a device with which it is possible to equip a machine tool in the most general sense with tools such that the point of impingement of the one or more medium jets is always correct, thus in general the site of the chip removal, and moreover such that the washing and cooling process takes place with a minimum use of energy and is thus as cost-effective as possible.

SUMMARY OF THE INVENTION

The inventors have thus found a strikingly simple solution. This consists essentially in the provision of a large number of nozzle bodies, with an individual nozzle body thereby being designed such that the washing and cooling process for a particular tool can be designed in an optimal manner. Thus a particular nozzle body is adapted and assigned to the supply of washing and cooling medium to a very particular tool.

Here it is also conceivable that a nozzle body is designed such that it is suitable for a plurality of tools that are of very similarly design and dimensions in order to accomplish the object cited above.

A facility for the equipment of a machine tool with tools, which during the operation of the machine tool are cooled by a flowing medium, comprises a plurality of different tools, with which machining processes are undertaken in sequence on a workpiece, and a plurality of different nozzle devices, each of which can be assembled with a tool and can be connected to a medium source. Each nozzle device has nozzle holes, which are designed and arranged such that the medium jet impinges at the point at which machining of the workpiece is taking place. The tools are stored in a tool magazine and the nozzle devices are stored in a nozzle device magazine. A first conveyor device is provided, which assembles a particular tool with a particular nozzle device. A second conveyor device is provided, which in each case introduces a particular pairing of a tool and a nozzle device according to a program in the machine tool.

The invention is elucidated in more detail with the aid of the drawing. In the drawing the following are individually represented:

BRIEF DESCRIPTION OF THE DRAWINGS

FIG. 1A is a detail of FIG. 1.

DESCRIPTION OF A PREFERRED EMBODIMENT

Figure 1:
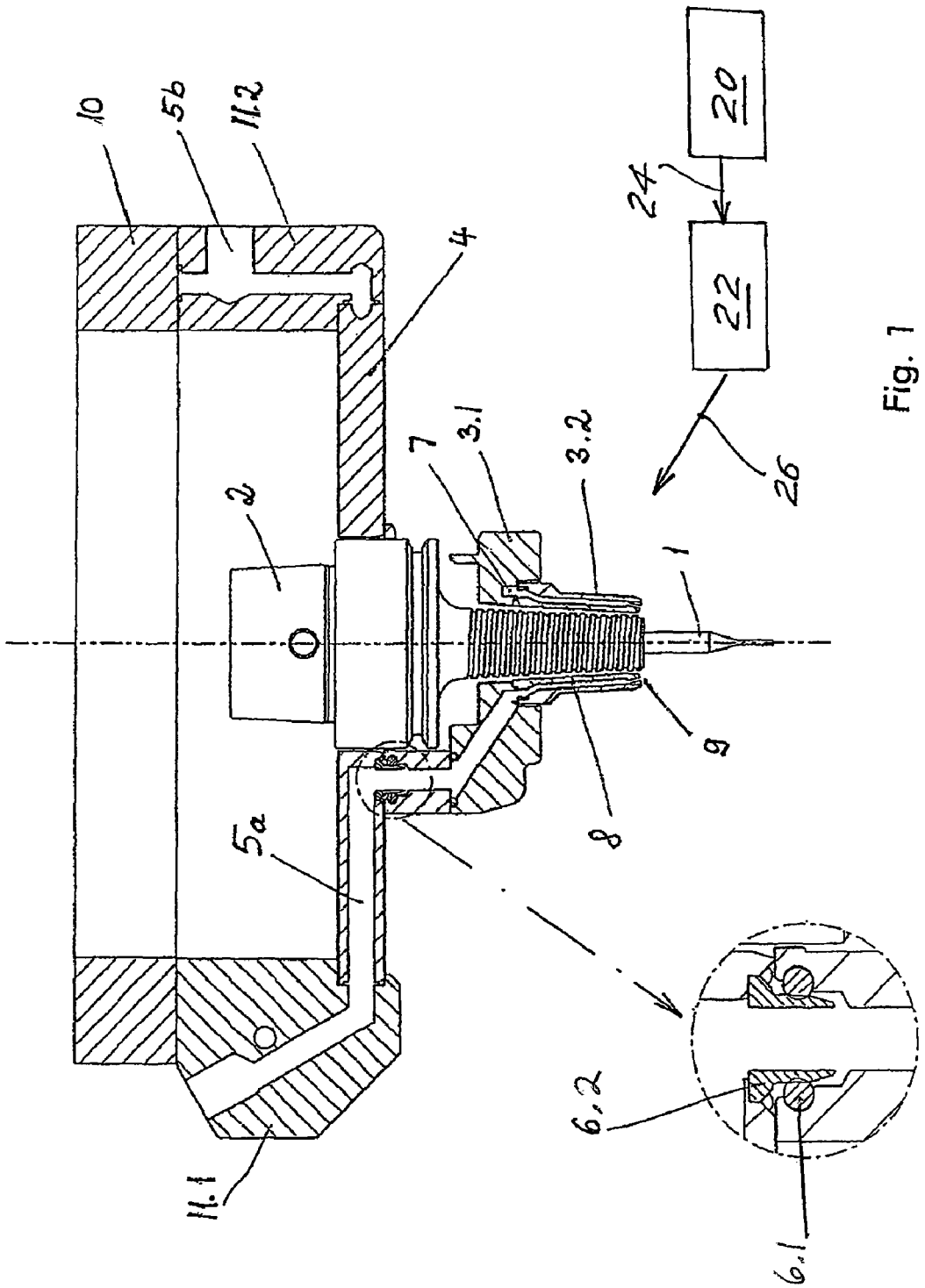
FIG. 1 shows in a vertical section on line 1-1 in FIG. 2 a tool and a nozzle body, both installed in a machine tool, the section of which cannot be detected.

In FIG. 1 one recognises in detail a tool 1. This can be a milling cutter, or a drill bit, or a reamer, or another tool.

The tool 1 is clamped in a tool holder 2. The tool holder is fixed to the frame of the machine tool, which is not shown in detail.

A nozzle body 3 comprises an upper, cylindrical part 3.1 and a lower truncated cone shaped part 3.2. The nozzle body 3 is fixed to a nozzle plate 4 by means of a latching mechanism, which will be described further below.

A washing medium is supplied to the nozzle body 3 from above. This is directed into a passage 5a, which extends in the nozzle plate 4 in the horizontal direction. It flows through a valve body 6, then arrives at a horizontal annular passage 7, then into holes 8, which are located in the lower truncated cone shaped part 3.2 of the nozzle body, and exits through the nozzles 9. In the present case the nozzles are circular in cross-section. A large number of nozzles are arranged in a distributed manner over the lower end face of the truncated cone shaped part 3.2. It is however also conceivable that instead of nozzles with a circular cross-section slit nozzles are provided, which extend over the periphery of the truncated cone shaped part 3.2, and which generate a practically seamless "curtain" of a single, annular shaped medium jet.

As one can see, the nozzles 9 are arranged at a particular angle to the longitudinal axis of the tool 1. The angle is dimensioned such that the medium jets exiting from the nozzles 9 impinge at that point where washing and/or cooling must occur, that is to say, in the chip removal region. In this manner the nozzle body 3 is in all details matched to the tool 1 that is here being used.

In the present case there is no fixed connection between the nozzle body 3 and the tool holder 2. Each is mounted independent of the other in the machine tool. This could, however, also be otherwise.

What is essential is that a particular nozzle body 3 is assigned to a particular tool, so that the desired result is achieved, that is to say, the impingement of the medium jet at the correct point.

The assembly of the two parts cited must, of course, take place before the start of the machining process. This can take place in the machine tool, but also externally, for example by the preparation of a particular nozzle body and a particular tool. When one talks here of "assembly" it is to be understood that this may also include just a bringing together of items that are not fixed. A more or less fixed form of assembly would, however, also be possible. The tools 1 are stored in a tool magazine 20 and the nozzle bodies 3 are stored in a nozzle device magazine 22. A first conveyor device 24 is provided, which assembles a particular tool with a particular nozzle body. A second conveyor device 26 is provided, which in each case introduces a particular pairing of a tool and a nozzle body according to a program in the machine tool.

Figure 2:
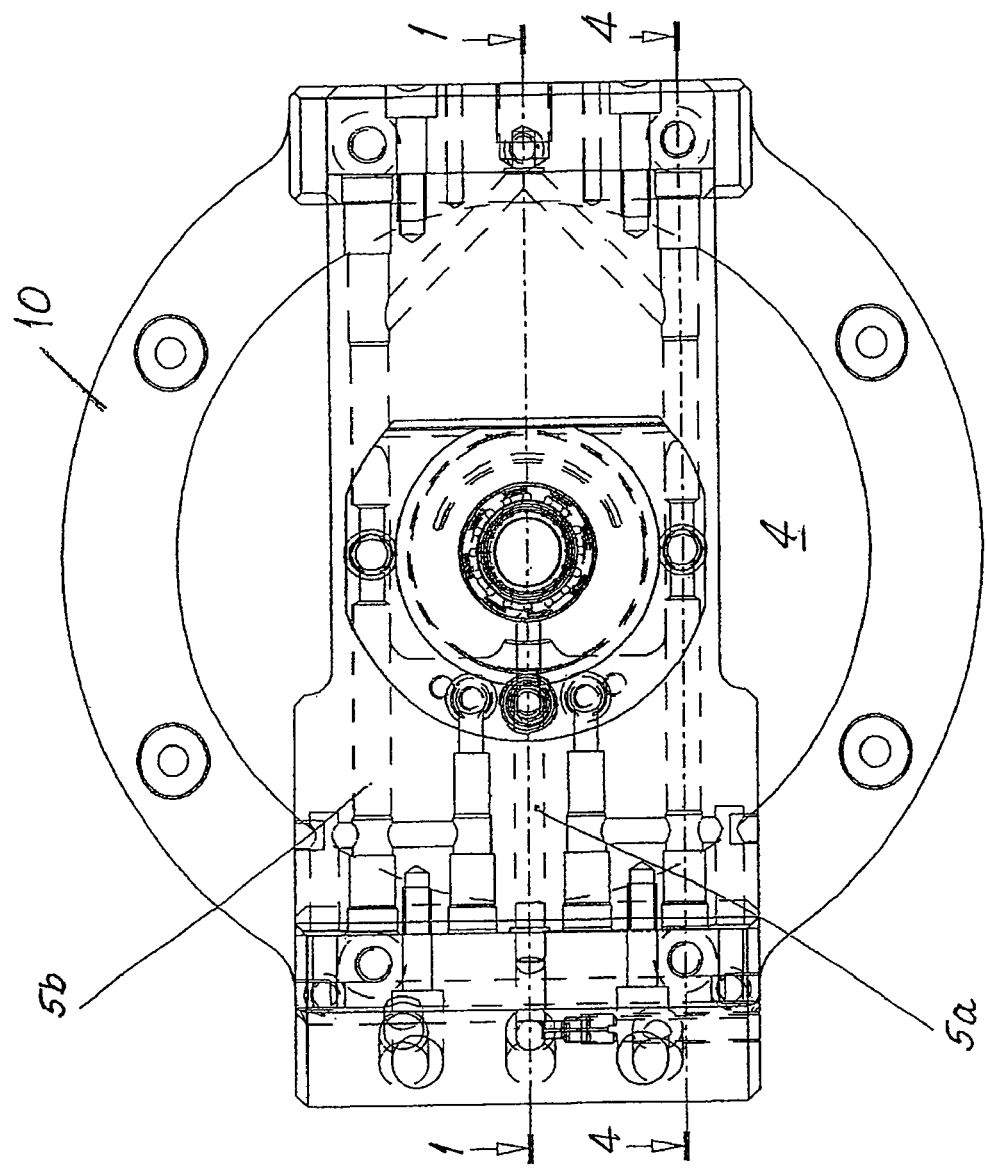
FIG. 2 shows a plan view onto the subject of FIG. 1.

In the plan view according to FIG. 2 a two-part flange plate 10 can be recognised, which is securely connected via intermediate pieces 11 with the nozzle plate 4. See also FIG. 1.

From FIG. 2 the contour of the cylindrical part of the nozzle body 3 can be recognised, as can the medium channel 5a in the nozzle plate 4.

Figure 3:
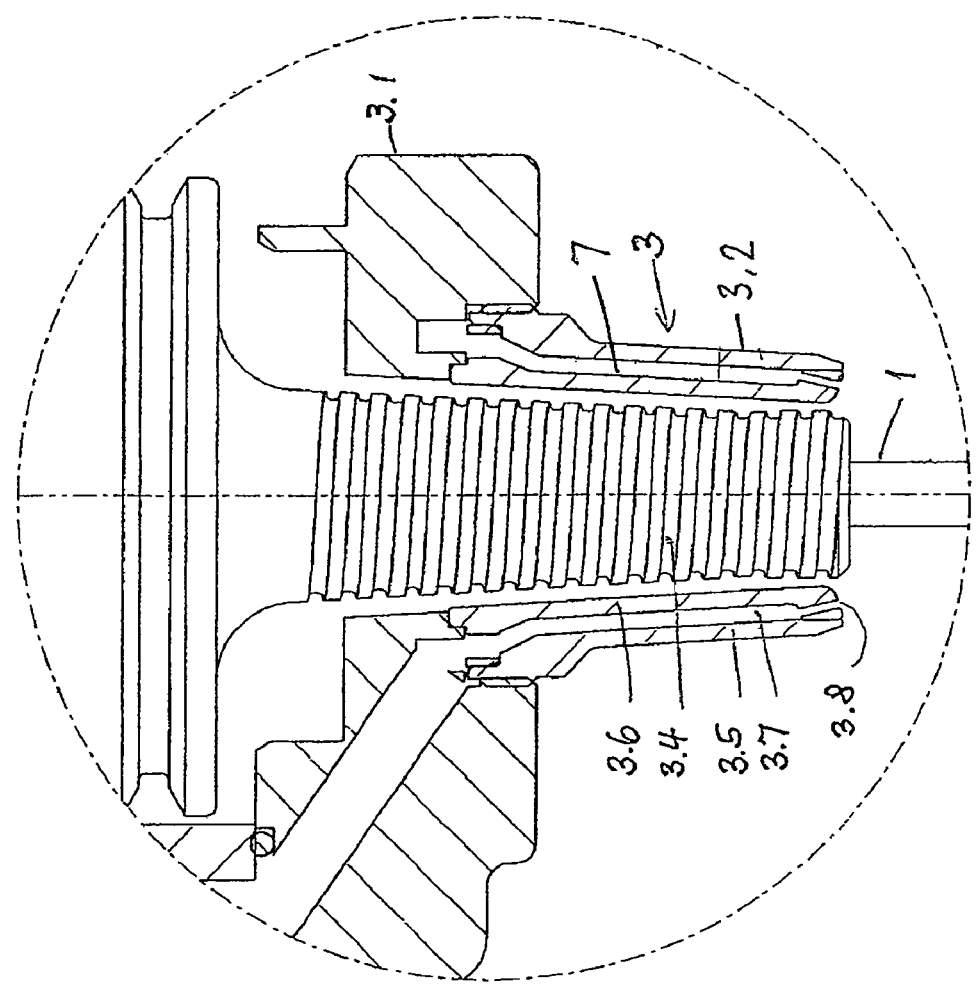
FIG. 3 is a sectional view of the lower part of the subject of FIG. 1 in an enlarged representation.
Figure 4:
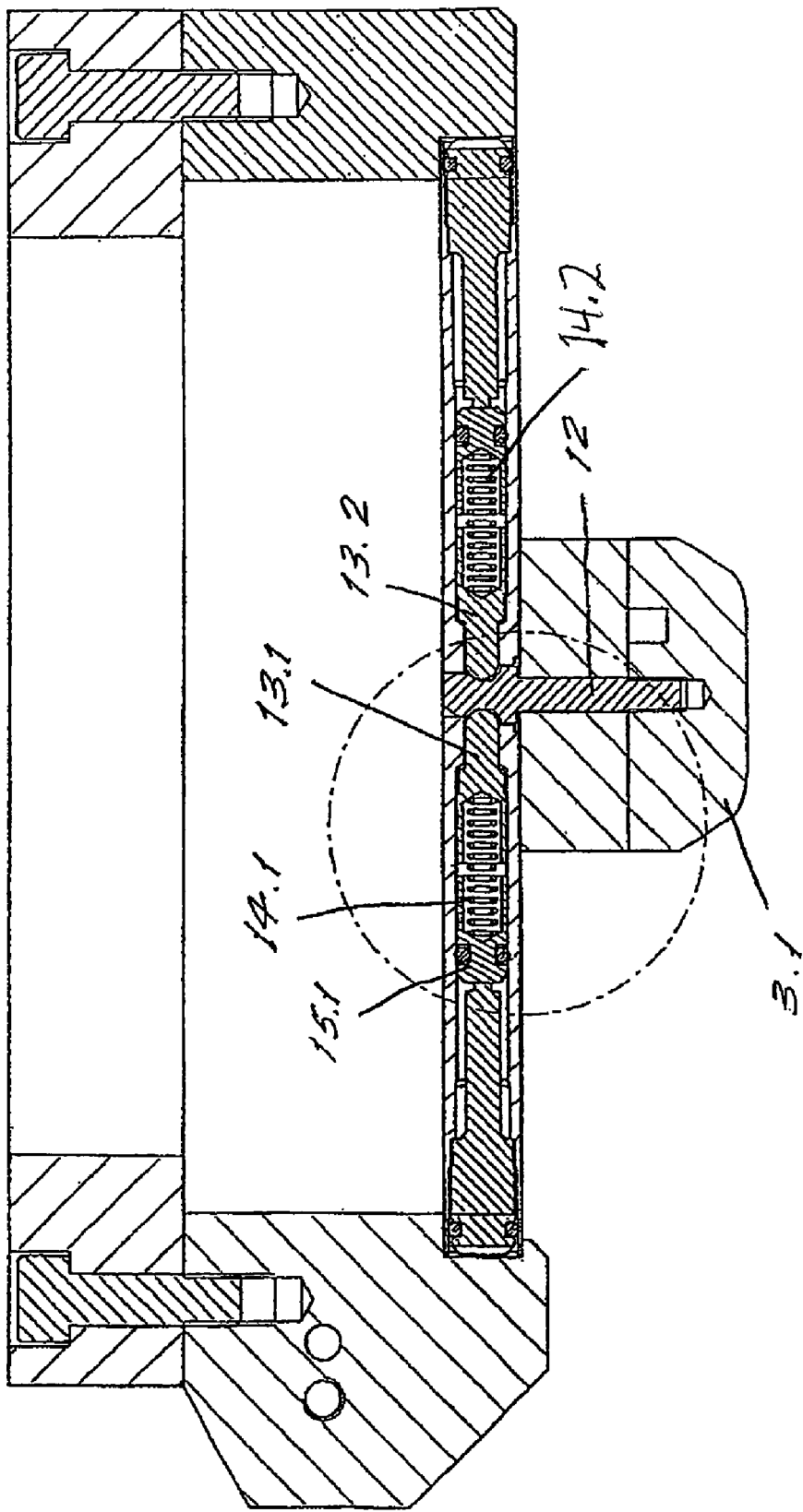
FIG. 4 is a sectional view of the subject of FIG. 2, as presented in the section plane 4-4 in FIG. 2.

From the sectional representation according to FIG. 3 the following elements can be recognised in turn: the tool 1, the nozzle body 3 with its upper cylindrical part 3.1 and its lower conical part 3.2. The nozzle body 3 includes an inner, conical core 3.4 with a surrounding helix, which leads downwards and provides the air line and air cooling.

The nozzle body 3 also includes an outer sleeve 3.5 and an inner sleeve 3.6. An annular gap 3.7 is located between them. The annular gap extends over the whole length of the two sleeves 3.5, 3.6.

The annular gap 3.7 is blocked off at its lower end, apart from holes 3.8. These are arranged so as to be uniformly distributed over the whole circumference of the annular gap 3.7. The holes 3.8 are essential for the mode of action of the device. In fact they run at a particular angle of inclination to the longitudinal axis of the tool 1. The angle of inclination is designed such that the exiting medium jets impinge at the point of machining of the tool 1, that is to say, where contact takes place between tool 1 and workpiece.

The enlargement represented in FIG. 1a shows the valve body, which can also be recognized in FIG. 1. It includes a rubber collar 6.1, which surrounds a baseplate 6.2. The rubber collar 6.1 acts such that the medium can only flow through the medium holes of the baseplate 6.2 if the nozzle body 3 is reliably and faultlessly connected to the nozzle plate 4 by means of a latch.

Figure 5:
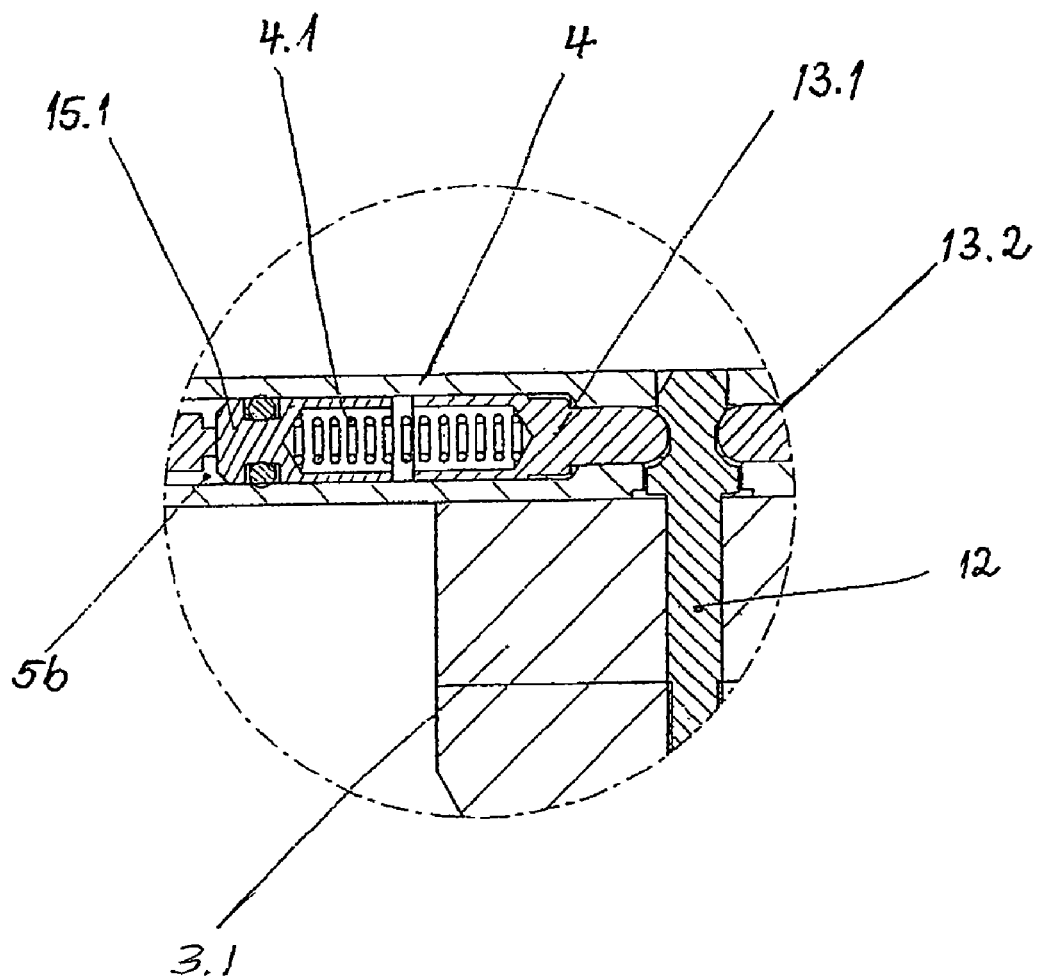
FIG. 5 is an enlargement of a detail from FIG. 4.

The sectional view shown in FIG. 5 in turn allows the nozzle plate 4, the flange plate 10 and the intermediate pieces 11 to be recognised.

It illustrates in particular the manner in which the nozzle body 3—see its upper cylindrical part 3.1—is fixed to the nozzle plate 4. A plug 12 can be recognised. This is screwed into the cylindrical part 3.1 of the nozzle body. Two pistons 13.1, 13.2 are provided. These lie diametrically opposite to one another, as seen relative to the plug 12. They are supported such that they can slide in the nozzle plate 4, and by the pressure of springs 14.1, 14.2 are loaded such that they act so as to clamp the head of the plug 12. The head of the plug 12 and the free ends of the pistons 13.1 and 13.2 are of corresponding design. In the sectional view represented the head of the plug 12 has a groove, and the free ends of the pistons 13.1 and 13.2 are conical in shape.

If the nozzle body 3 is clamped in the manner represented, the medium also acts so as to provide a clamping action. Thus the medium flows through the cited hole 5 in the nozzle plate 4 and acts on each of the end faces of the two pistons, 13.1 and 13.2, that are facing away from the conically shaped free ends.

The components mentioned here and included in the claims could also consist of plastic, for example, the nozzle body.

In addition to the measure according to the invention—the pairing of a particular tool with a particular nozzle body—it would also be conceivable to use classical measures. Thus, for example, the medium jets exiting from the nozzle body could be adjustable in angle. They could, for example, emerge from small tubes, the direction of which is adjustable.

REFERENCE SYMBOL LIST

1 Tool
2 Tool holder
3 Nozzle body
3.1 Upper cylindrical part of the nozzle body
3.2 Lower truncated cone shaped part of the nozzle body
3.4 Conical core
3.5 Outer sleeve
3.6 Inner sleeve
3.7 Annular gap 3.8 Nozzle holes
4 Nozzle plate
5 Channel In the nozzle plate
6 Valve body
6.1 Rubber collar
6.2 Baseplate
7 Annular channel
8 Holes
9 Nozzles
10 Flange plate
11 Intermediate pieces
12 Plug
13.1 Piston
13.2 Piston
14.1 Spring
14.2 Spring
20 Tool magazine
22 Nozzle device magazine
24 First conveyor device
26 Second conveyor device

The invention claimed is:

1. A facility for the equipment of a machine tool with tools, which during the operation of the machine tool are cooled by a flowing medium,
- with a plurality of different tools, with which machining processes that follow one another are undertaken on a workpiece;
- with a plurality of different nozzle devices, each of which can be assembled with a respective one of the tools and can be connected to a medium source;
- each nozzle device has nozzle holes, which are designed and arranged such that the medium jet impinges at the point at which machining of the workpiece is taking place; wherein:
- the tools are stored in a tool magazine;
- the nozzle devices are stored in a nozzle device magazine;
- a first conveyor device is provided that assembles a particular tool with a particular one of the nozzle devices;
- a second conveyor device is provided that in each case introduces a particular assembled pairing of a tool and a nozzle device into the machine tool in accordance with a program.

2. The facility according to claim 1, wherein:
- each nozzle device includes an inner body and an outer body;
- the inner body can be inserted into the outer body so as to allow an annular gap;
- at the exit end of the nozzle device, the annular gap is blocked except for nozzle holes.

3. The facility according to claim 2, wherein:
- each nozzle device includes a nozzle plate and a nozzle body, and
- the nozzle body is fixed by means of a latch to the nozzle plate.

4. The facility according to claim 1, wherein:
- each nozzle device includes a nozzle body, and
- each nozzle body includes an upper cylindrical part and a lower conical part.

* * * * *